United States Patent [19]
Kintis et al.

[11] Patent Number: 5,661,582
[45] Date of Patent: Aug. 26, 1997

[54] PHOTONIC INTERCONNECT AND PHOTONIC PROCESSING FOR COMMUNICATIONS AND DATA HANDLING SATELLITES

[75] Inventors: Mark Kintis, Manhattan Beach; Scott K. Isara, Torrance; John C. Brock, Redondo Beach; Lawrence R. Tittle, Palos Verdes Estates; Peter R. Pawlowski, Manhattan Beach, all of Calif.

[73] Assignee: TRW Inc., Redondo Beach, Calif.

[21] Appl. No.: 548,535

[22] Filed: Oct. 26, 1995

[51] Int. Cl.$^6$ .................................................. H04B 10/00
[52] U.S. Cl. ................... 359/172; 359/128; 359/129; 359/179; 455/12.1
[58] Field of Search .................. 359/172, 133, 359/127, 128–129, 124, 173, 179; 455/12.1, 13.1, 13.3

[56] References Cited

U.S. PATENT DOCUMENTS 5,173,794  12/1992  Cheung et al. ........................ 359/133
5,402,259  3/1995  Lembo et al. ......................... 359/245
5,475,520  12/1995  Wissinger ............................. 359/172

FOREIGN PATENT DOCUMENTS

2267006  11/1993  United Kingdom .................. 359/172

*Primary Examiner*—Kinfe-Michael Negash
*Attorney, Agent, or Firm*—Michael S. Yatsko

[57] ABSTRACT

A photonic interconnect and photonic processing apparatus (10) for use in a communication and data handling satellite (12) is disclosed. The photonic interconnect and photonic processing apparatus (10) includes a receiving device (14) for receiving a plurality of input RF signals. An optical conversion device (28) coupled to the receiving device (14) converts the plurality of input RF signals to a plurality of input optical signals. This plurality of input optical signals are coupled to a plurality of input optical fibers (30). A distribution device (32) optically coupled to the optical conversion device (28) distributes at least one output optical signal from the plurality of input optical signals coupled to the plurality of input optical fibers. The at least one output optical signal is coupled to at least one output optical fiber (30) such that the at least one output optical signal coupled to the at least one output optical fiber (30) is distributed within the communication and data handling satellite (12).

22 Claims, 5 Drawing Sheets

PHOTONIC INTERCONNECT AND PHOTONIC PROCESSING FOR COMMUNICATIONS AND DATA HANDLING SATELLITES

BACKGROUND OF THE INVENTION

1. Field of the Invention

This invention relates generally to communication and data handling satellites and, more particularly, to a photonic interconnect and photonic processing apparatus for communication and data handling satellites.

2. Discussion of the Related Art

The exploding demand for global wireless communications, data gathering and signal processing is currently placing unprecedented requirements on the capabilities of communication and data handling satellites. These satellites include single platform communication systems which operate independently from other systems, multi-platform communication systems which employ many cross-linked satellites, and data handling systems which sense and monitor various parameters. This demand is dramatically increasing signal traffic which is leading to saturation of existing RF bands that have been allocated for the various communication functions. Such saturation is increasing the need to utilize new frequency bands at much higher frequencies.

As a result, future communication and data handling satellites will be required to process very wide bandwidths comprised of densely populated signals. Moreover, these satellites will need to provide frequency conversion capabilities to route signals through different allocated bands assigned by different international regulatory agencies. However, the use of current satellite RF signal interconnects and distribution systems has several disadvantages.

For example, existing communication and data handling satellites are RF coaxial cable driven. In other words, signals received and transmitted by the satellites, via its antenna, are interconnected and distributed throughout the satellite on coaxial cables. Coaxial cables are inherently large, bulky and heavy transmission mediums. Moreover, coaxial cables are designed to operate in a specific frequency band and are thus substantially band limited. Still further, coaxial cables tend to exhibit very high losses as the frequency increases.

The above-identified disadvantages associated with the use of coaxial cables is further amplified by its use in satellites. Specifically, the losses exhibited with coaxial cables require the satellite to have additional amplifiers which requires larger power supplies, which in turn requires more solar panels to supply the energy to the system. The weight and size of the satellite is also significantly increased because of these losses, as well as because of the size and weight of the coaxial cables. This increase in weight and size also ultimately increases launch costs of the satellite. Still further, since coaxial cables are bandwidth limited, a greater number of coaxial cables are required to handle various frequency bands the satellite may operate at. This causes the satellite to be less versatile at handling multiple frequency bands.

What is needed then is a photonic interconnect and photonic processing apparatus for communication and data handling satellites which does not suffer from the above mentioned disadvantages. This will, in turn, increase bandwidth capabilities; increase versatility; decrease weight and size of the satellite; decrease power consumption and need; decrease launch costs; and decrease the overall cost of communication and data handling satellites. It is, therefore, an object of the present invention to provide such a photonic interconnect and photonic processing apparatus for communication and data handling satellites.

SUMMARY OF THE INVENTION

In accordance with the teachings of the present invention, a photonic interconnect and photonic processing apparatus for use in a communication and data handling satellite is disclosed. The photonic interconnect and photonic processing apparatus couples RF signals received by the satellite onto optical fibers which are routed throughout the satellite. This is basically achieved by receiving a plurality of RF signals and converting the plurality of RF signals into optical signals coupled to optical fibers which are subsequently distributed within the communication and data handling satellite.

In one preferred embodiment, a receiving device receives a plurality of input RF signals. An optical conversion device coupled to the receiving device converts the plurality of input RF signals to a plurality of input optical signals. This plurality of input optical signals are coupled to a plurality of input optical fibers. A distribution device is optically coupled to the optical conversion device for distributing at least one output optical signal from the plurality of input optical signals coupled to the plurality of input optical fibers. The at least one output optical signal is coupled to at least one output optical fiber such that the output optical signal coupled to the output optical fiber is distributed within the communication and data handling satellite.

Use of the present invention provides a photonic interconnect and photonic processing apparatus for use in a communication and data handling satellite. As a result, the aforementioned disadvantages associated with the current satellite RF signal interconnects and distribution systems have been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiments concerning a photonic interconnect and photonic processing apparatus for communication and data handling satellites is merely exemplary in nature and is no way intended to limit the invention or its application or uses.

Figure 1:
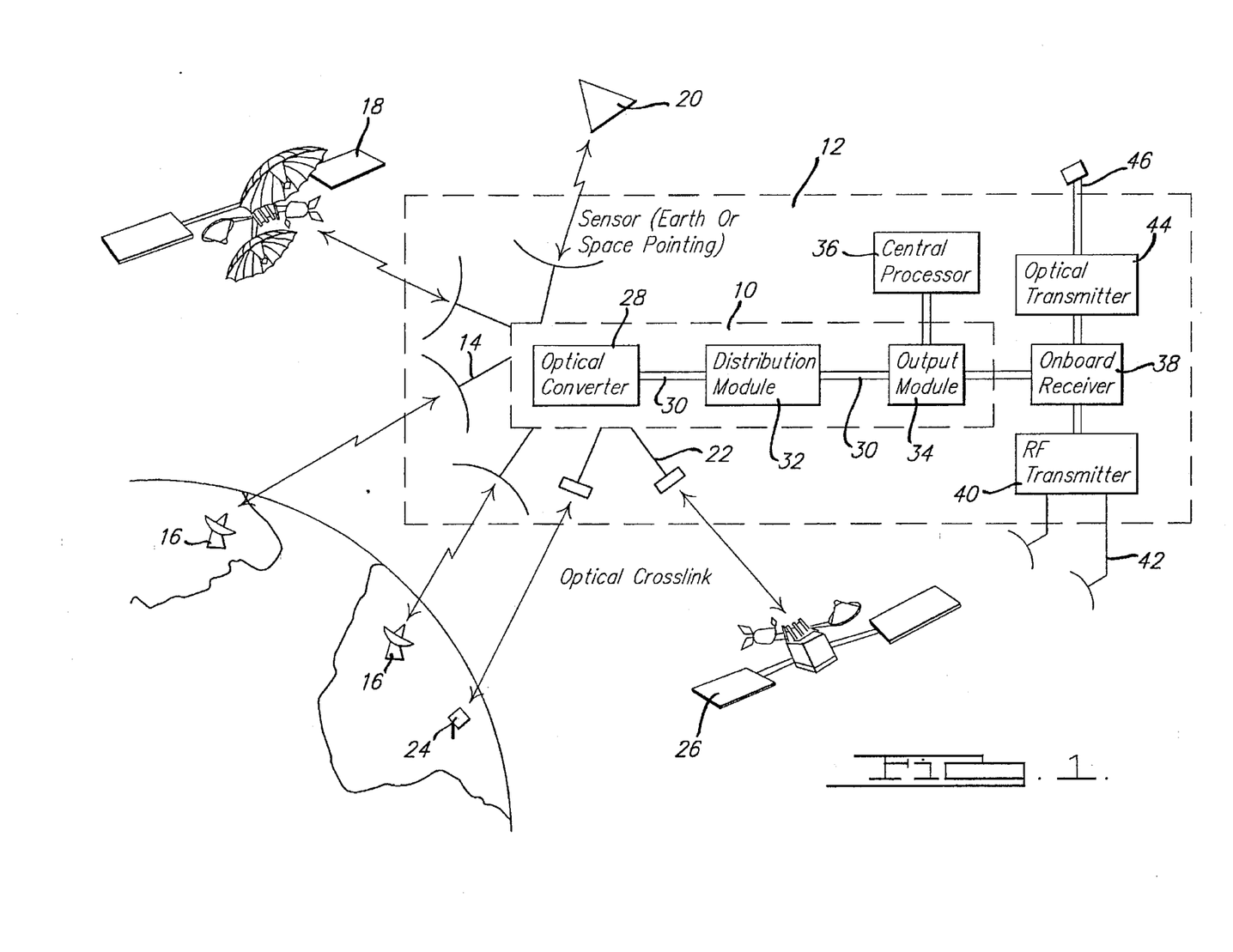
FIG. 1 is an overall system block diagram of one preferred embodiment of the present invention.

Referring to FIG. 1, a photonic interconnect and photonic processing apparatus 10 is shown in a system environment.

The photonic interconnect and photonic processing apparatus 10 is incorporated into a communication and data handling satellite 12 and is used for satellite onboard distribution, switching/routing, processing and frequency conversion, which will be described in detail hereinafter. The photonic interconnect and photonic processing apparatus 10 is used in communication repeater and direct broadcast satellite systems that receive and transmit signals on RF carriers, optical carriers or a combination of both. The photonic interconnect and photonic processing apparatus 10 is also used in connection with remote sensors or sensing satellites that initiate data generation or perform data handling.

The photonic interconnect and photonic processing apparatus 10 includes multiple RF antennas 14 such as phased array antennas or multibeam antennas which are used to receive multiple RF signals. However, one skilled in the art would also appreciate that a single RF antenna 14 could also be utilized to receive multiple RF signals in different antenna beam patterns produced by the single antenna 14. The RF signals received by the antennas 14 are transmitted from ground based RF uplinks 16 and/or from crosslink satellites 18. Additional RF signals are transmitted from sensor equipment 20 either positioned in space or on the earth for sensing and monitoring various phenomenon. These RF signals operate in various frequency bands across the entire frequency spectrum each having potentially different bandwidths.

Alternatively, the communication and data handling satellite 12 may also receive communications or data signals which have already been encoded on optical carriers such as in laser communications. These direct optical signals are received from free-space optical receiver units 22. The optical signals received by the optical receiver units 22 are transmitted from ground based optical uplinks 24 and/or from optical crosslink satellites 26. The optical receiver units 22 are generally known in the art as telescopes which have a lens that focuses the optical beam generally transmitted by a laser.

The various RF signals received by the antennas 14 are modulated or frequency translated into one or more optical carriers in an optical converter 28 for transmission on lightweight, wide bandwidth input optical fibers 30 which are routed throughout the satellite 12. Alternatively, the various RF signals may be first RF multiplexed at the front end onto a single RF transmission line before being coupled onto a single optical fiber 30. The optical signals received by the optical receiving unit 22 are also passed directly onto the lightweight, wide bandwidth input optical fibers 30 in the optical converter 28.

The optical signals on the optical fibers 30 are distributed and/or routed throughout the satellite 12, via a distribution module 32 which is optically coupled to the optical converter 28. From the distribution module 32, the optical signals are applied to and processed in an output module 34 which is optically coupled to the distribution module 32, via output optical fibers 30. From the output module 34, the optical signals and RF signals are applied to a central processor 36, an onboard receiver 38, a RF transmitter 40 for RF transmission, via RF transmit antennas 42 and an optical transmitter 44 for optical transmission, via optical transmitting unit 46 consisting of a laser. The central processor 36 receives RF and/or optical signals for use in the control and operation of the satellite 12. The onboard receiver 38 also receives RF and/or optical signals which may be transmitted, via RF transmitter 40 and/or optical transmitter 44.

Figure 2:
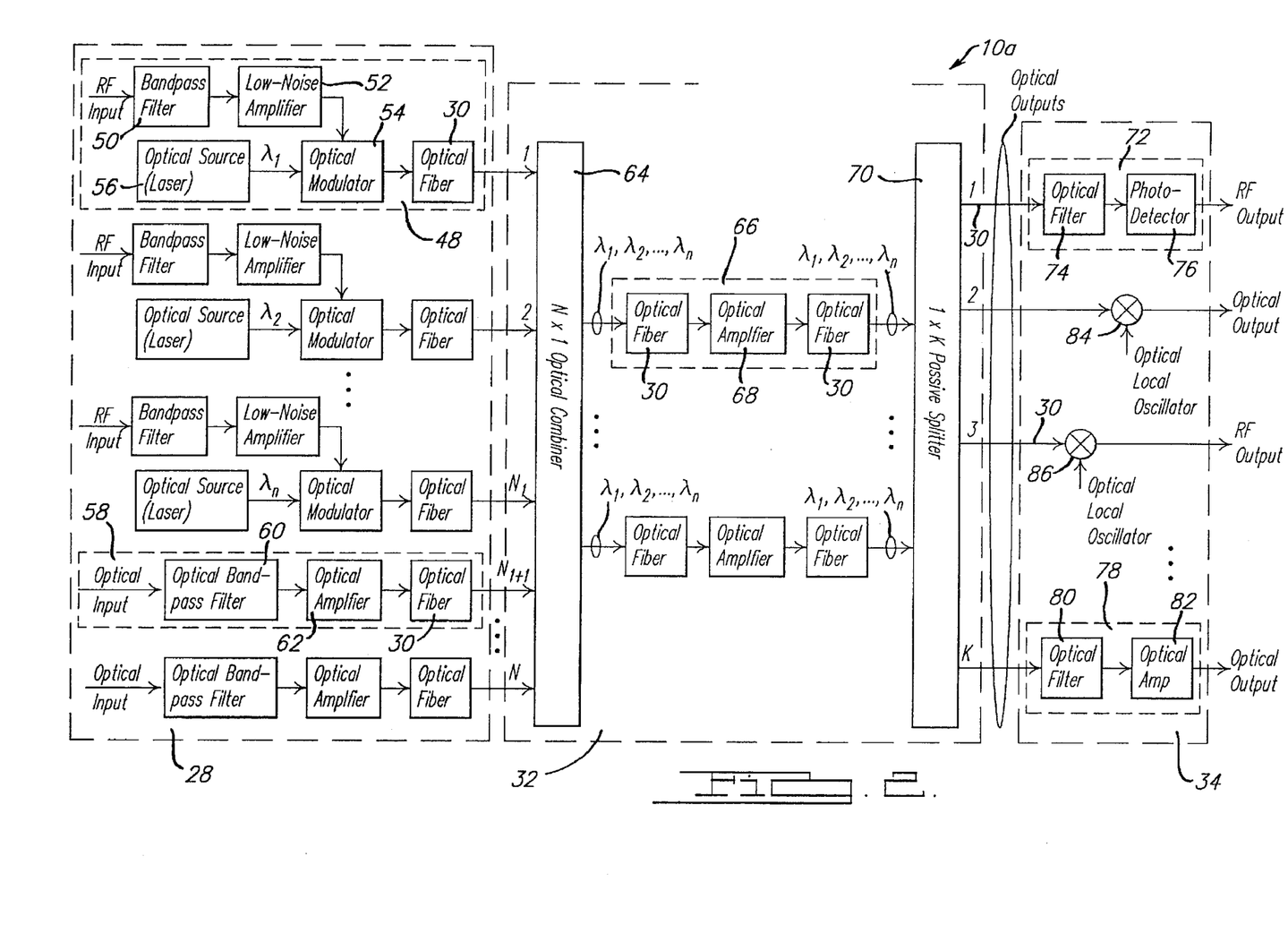
FIG. 2 is a detailed schematic block diagram of one preferred embodiment of the present invention.

Turning to FIG. 2, a detailed schematic block diagram of a first preferred embodiment of the photonic interconnect and photonic processing apparatus 10a is shown. The photonic interconnect and photonic processing apparatus 10a utilizes a wavelength division multiplex (WDM) format, wherein each optical signal has a different optical wavelength carrier signal which are all applied to a single optical fiber 30 in a summed or multiplexed manner. The photonic interconnect and photonic processing apparatus 10a includes the optical converter 28 optically coupled to the distribution module 32, via input optical fibers 30, which in turn is optically coupled to the output module 34, via output optical fibers 30. The optical fibers 30 used with the photonic interconnect and photonic processing apparatus 10a may be multi-mode or single mode fiber optic cables, as appropriate.

The optical converter 28 includes a plurality of RF-to-optical signal paths 48 corresponding to the number of antenna beams or RF antennas 14. Each RF-to-optical signal path 48 includes a bandpass filter 50 used to filter the desired RF input signal and reject the noise received by the antenna 14. The filtered RF signal from the bandpass filter 50 is applied to a low-noise amplifier (LNA) 52 which amplifies the low power RF signal. The low-noise amplifier 52 may consist of a high electron mobility transistor (HEMT) amplifier which uses known MMIC (Monolithic Microwave Integrated Circuit) technology. This type of amplifier provides very high gain with very little noise.

The amplified RF signal from the low-noise amplifier 52 is applied to an optical modulator 54, such as that disclosed in commonly assigned U.S. Pat. No. 5,402,259, which is hereby incorporated by reference. The optical modulator 54 is driven by an optical source or laser 56 such that the optical modulator 54 takes the RF energy from the amplified RF signal and puts this on an optical carrier which is centered at about the wavelength ($\gamma_1$) of the laser 56. From this, the optical modulator 54 generates an optically modulated signal which is coupled to the input optical fiber 30. Since the optical fiber 30 is generally not bandwidth limited, the optical fiber 30 is able to transmit numerous variations of received RF signals which have various operating frequencies and formats. Moreover, since the optical fiber 30 is not bandwidth limited, a single RF-to-optical signal path 48 may be used where the various RF signals are first RF multiplexed and applied to a single RF-to-optical signal path 48.

The optical converter 28 also includes multiple optical signal paths 58 generally corresponding to the number of optical receiving units 22. The optical input signal received by the optical receiving unit 22 is applied to an optical bandpass filter 60 which filters the desired optical carrier signal and rejects optical noise received by the optical receiving unit 22, such as from solar flares. The filtered optical signal from the bandpass filter 60 is amplified in an optical amplifier 62 before being optically coupled to the input optical fiber 30.

Each input optical signal on each input optical fiber 30 has an optical carrier signal having a unique wavelength (i.e. $\gamma_1$, $\gamma_2$, . . . ,$\gamma_n$) which is dictated by the wavelength of the laser 56 or by the received optical signal from the optical receiving unit 22. Each of these optical signals are optically coupled to the distribution module 32, via the input optical fibers 30.

The distribution module 32 includes an (N×1) optical combiner 64 which sums N-input optical signals from the input optical fibers 30 each having the unique optical wavelength carrier signal to create a single summed optical output signal ($S_{out}(t)$). Letting $j\omega_i t$ indicate the optical signal frequency and $I_k(t)$ indicate the optical intensity modulation, the summed optical output signal ($S_{out}(t)$) of the optical combiner 64 is the summation of the N-input optical signals corresponding to the following equation:

$$S_{OUT}(t) = \sum_{k=1}^{N} I_k(t) e^{j\omega_k t}.$$

The summed optical signal ($S_{out}(t)$) from the optical combiner 64 is preferably coupled to a single optical signal path 66 which routes throughout the satellite 12. The optical signal path 66 includes the optical fiber 30, an optical amplifier 68 which amplifies the summed optical signal and another optical fiber 30. To accommodate for any power or dynamic range limitations in the optical amplifier 68, additional optical signal paths 66 may be used to transmit only a sub-set of the N-input optical signals such that the optical combiner 64 will have multiple outputs corresponding to the number of optical signal paths 66. Each of the optical signal paths 66 will transmit a sub-set of the N-input optical signals, wherein the summation of all the optical signal paths 66 will include all the N-input optical signals.

The summed optical signal ($S_{out}(t)$) on the optical signal path 66 is optically coupled to a (1×K) passive splitter 70. The passive splitter 70 power divides the summed optical signal ($S_{out}(t)$) from the signal path 66 which includes all the N-input optical signals and distributes the summed optical signal ($S_{out}(t)$) to each K-output of the passive splitter 70. The passive splitter 70 may consist of a single input, K-output star coupler which is implemented by connecting one-optical fiber 30 to N-optical fibers 30. However, other conventional passive splitting techniques could also be used, as well as active splitting techniques where the function of passive splitters preceded or followed by optical amplifiers is accomplished by active splitters which incorporate the amplification function. At each K-output, all of the N-input optical signals are thus present in a summed or multiplexed manner. In addition, if multiple optical signal paths 66 are used to carry only a sub-set of the N-input optical signals, the passive splitter 70 first combines all the N-input optical signals before power dividing the summed optical signal ($S_{out}(t)$) to the optical K-outputs so that each N-input optical signal is still present at each K-output.

The optical K-outputs from the passive splitter 70 are optically coupled to the output module 34, via the optical fibers 30. The output module 34 transfers the optical signals along various signal paths for processing the optical K-outputs. A first signal path 72 includes a tunable optical filter 74 which selects one wavelength (i.e. $\gamma_1, \gamma_2, \ldots, \gamma_n$) and rejects the other wavelengths. The selected optical signal from the optical filter 74 is applied to a photo-detector 76 which converts the selected optical signal to an RF signal corresponding to its RF input signal. This RF signal may be subsequently applied to the central processor 36, the onboard receiver 38, or the RF transmitter 40.

A second signal path 78 includes a tunable optical filter 80 and an optical amplifier 82. The tunable optical filter 80 selects a desired wavelength (i.e. $\gamma_1, \gamma_2, \ldots, \gamma_n$) and rejects the other wavelengths. The optical amplifier 82 amplifies the optical signal selected due to the losses incurred during the power divide in the passive splitter 70. The resultant amplified optical signal may then be applied to the central processor 36, the onboard receiver 38, or the optical transmitter 44, via optical fibers 30 routed throughout the satellite 12.

Additional signal paths include an optical-to-optical mixer 84 which optically mixes the K-output optical signal with an optical local (LO) oscillator signal, thereby generating a optical output signal having a different wavelength optical carrier signal from the optical input signal. Another signal path includes an optical-to-optical mixer 86 similar to the mixer 84. However, the mixer 86 includes a photo-detection step to convert the optical output signal to an RF output signal. The resultant optical output signal or the RF output signal can then be transmitted by the optical transmitter 44 or the RF transmitter 40.

Figure 3:
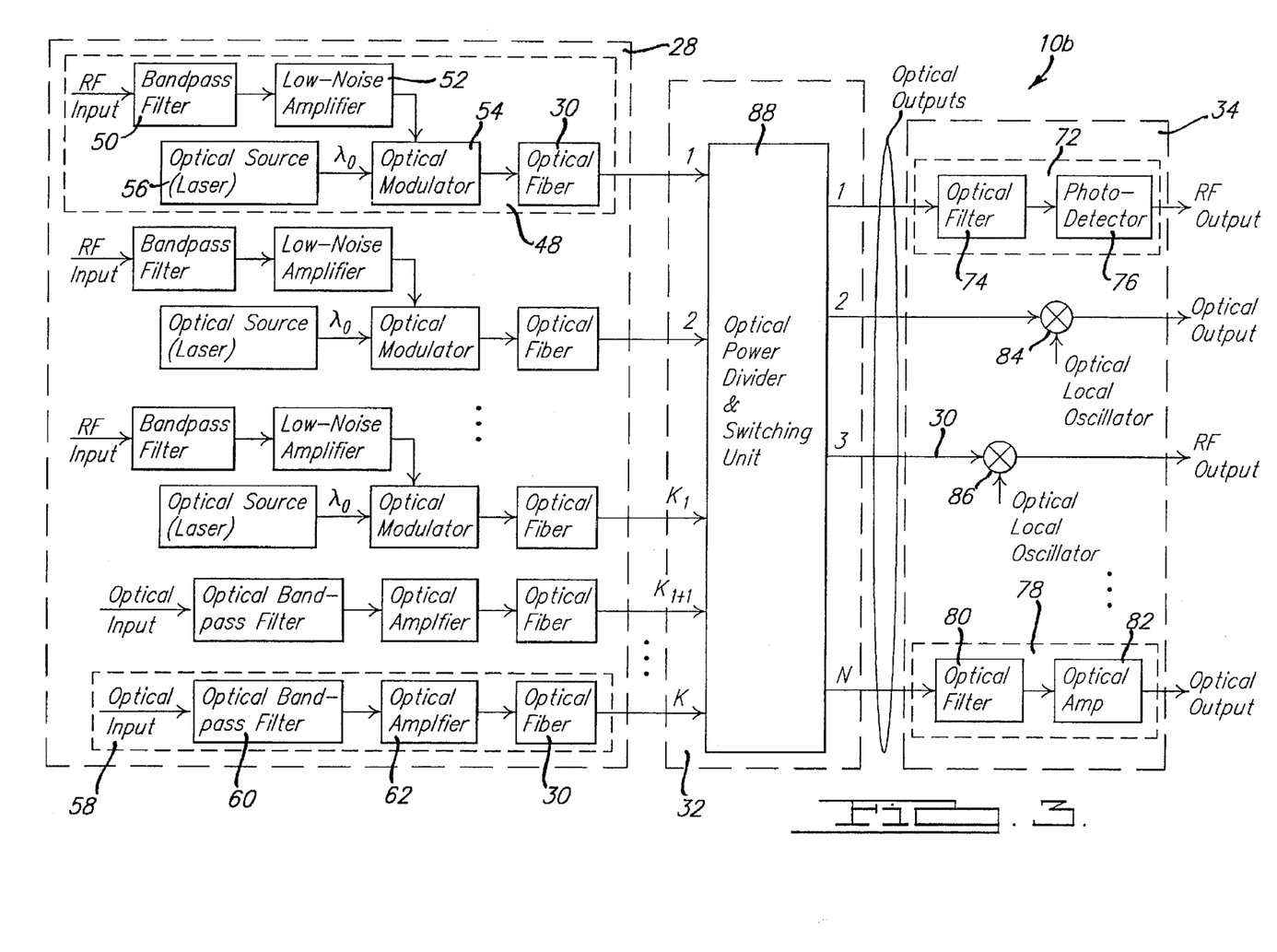
FIG. 3 is a detailed schematic block diagram of another preferred embodiment of the present invention.

Turning to FIG. 3, a second preferred embodiment of the photonic interconnect and photonic processing apparatus 10b is shown. In this regard, like reference numerals will be used to refer to similar elements which have been described in connection with the first preferred embodiment. The photonic interconnect and photonic processing apparatus 10b operates as a single wavelength system which is referred to as a space division multiplex system or a fiber division multiplex system. Here again, the photonic interconnect and photonic processing apparatus 10b includes the optical converter 28, the distribution module 32 and the output module 34 which are each optically coupled with the optical fibers 30. The photonic interconnect and photonic processsing apparatus 10b may utilize multi-mode or single-mode fiber optic cables as appropriate.

At each RF input in the RF signal paths 48 of the optical converter 28, the RF signal is bandpass filtered in the bandpass filter 50, amplified with the low-noise amplifier 52, and applied to the optical intensity modulator 54 which is driven by the laser 56. The optical intensity modulator 54 varies the instantaneous optical power at the modulator output in proportion to the input RF signal and couples this to the input optical fiber 30. At each optical input in the optical signal path 58, the optical signal is filtered by the optical bandpass filter 60 and amplified by the optical amplifier 62 prior to being coupled to the input optical fiber 30.

The resultant input optical signals from the RF inputs and the optical inputs are applied, via input optical fibers 30, to an optical power divider and switching unit 88 of the distribution module 32. The optical power divider and switching unit 88 routes any of the K-input optical signals to any of the optical N-outputs. The key distinguishing feature of the second preferred embodiment is that each single optical fiber 30 carries only a single optical signal having a single wavelength (i.e. $\gamma_0$) optical carrier signal as opposed to a summed or multiplexed optical signal.

Preferably, each wavelength for each optical carrier signal has the same wavelength. Thus, lasers 56 may all have the same optical wavelength which will also correspond to the wavelength of the optical input signals received by the optical receiving unit 22. However, one skilled in the art would also appreciate that each optical fiber 30 could also have a unique wavelength optical carrier signal to minimize interferometric ringing. Moreover, a single laser 56 common to all the optical modulators 54 as opposed to individual lasers 56 could also be used. The optical signals passing through the optical power divider and switching unit 88 are again subsequently applied to the output module 34 having the various signal paths as described above.

Figure 4:
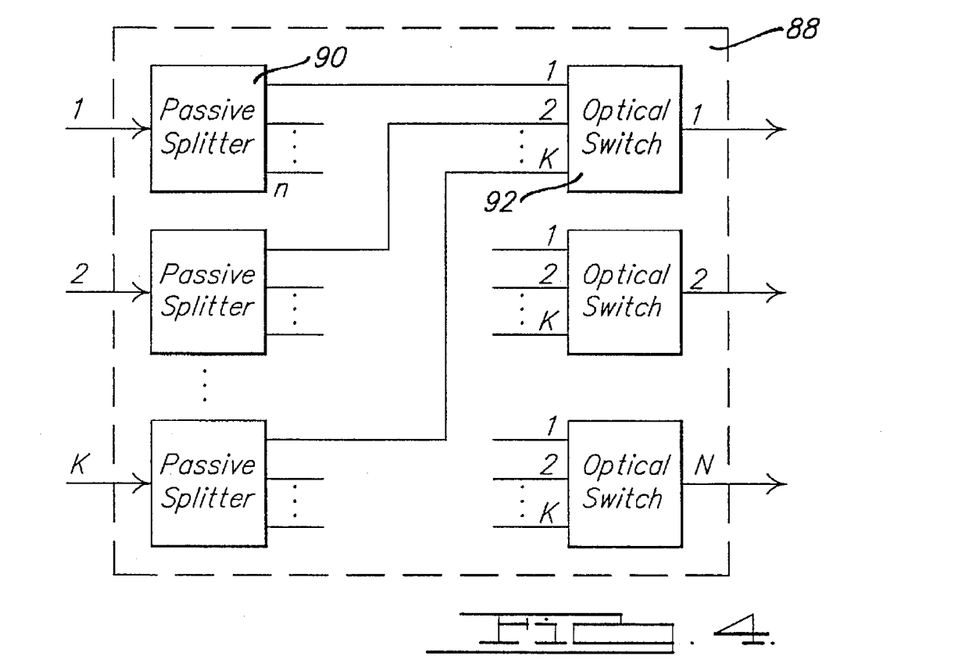
FIG. 4 is a detailed schematic block diagram of an optical power divider and switching unit of FIG. 3.

Referring to FIG. 4, a detailed schematic block diagram of the (K-input)×(N-output) optical power divider and switching unit 88 is shown. The optical power divider and switching unit 88 includes a plurality of passive splitters 90 corresponding to the number of optical K-inputs. Each passive splitter 90 power divides the K-input optical signal and distributes it to each of the N-outputs of the passive splitter 90. The passive splitter 90 may consist of a single K-input, N-output star coupler which is implemented by connecting a single input optical fiber 30 to N-output optical fibers 30. However, other conventional passive splitter techniques could also be utilized.

One output from each passive splitter 90 is applied to each of N-optical switches 92. Each optical switch 92 chooses among the K-inputs by selecting a single desired optical input signal and switching it to the output port. Since there are N(K-input)×(1-output) optical switches 92, the overall optical power divider and switching unit 88 is (K-input)× (N-output), where a single input can be routed to more than one output.

Figure 5A:
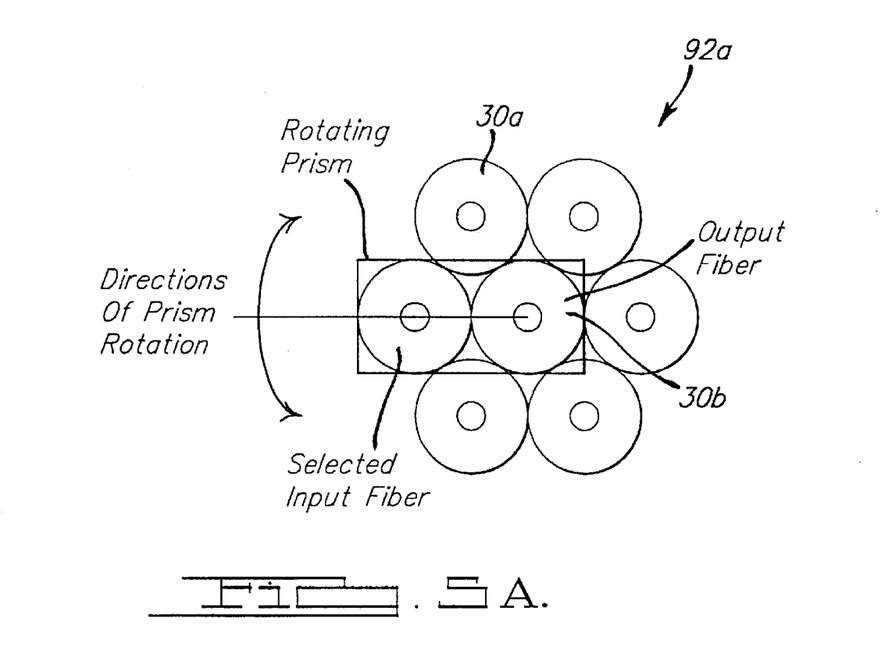
FIGS. 5A and 5B are detailed block diagrams of one preferred embodiment of an optical switch of FIG. 4.
Figure 5B:
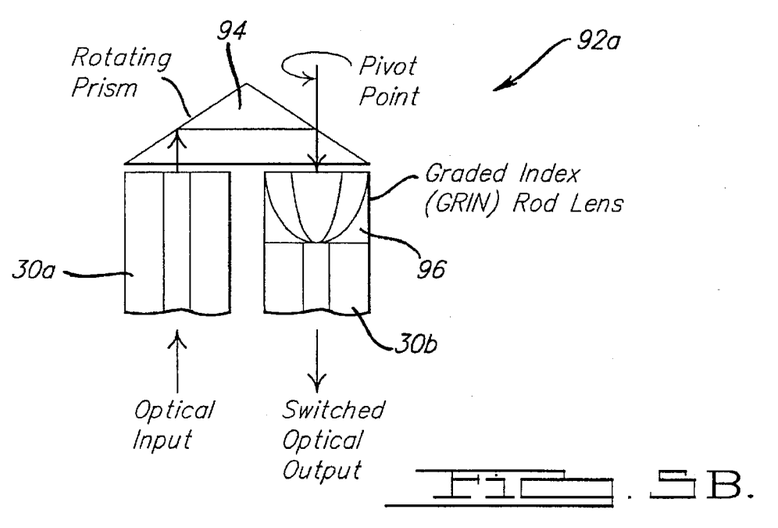

Referring to FIGS. 5A and 5B, an opto-mechanical embodiment of the (K-input)×(1-output) optical switch 92a is shown. For exemplary purposes, the optical switch shown in FIGS. 5A and 5B is a (6-input)×(1-output) optical switch 92a. However, one skilled in the art would readily recognize that any number of K-inputs could be utilized. Each of the K-input optical fibers 30a are arranged in a circle around a central output fiber 30b. A rotating prism 94 is rotated 360° about the central output fiber 30b such that the rotating prism 94 pivots on an axis defined by the longitudinal axis of the central output fiber 30b. As the prism 94 is rotated, the prism 94 passes over each individual input optical fiber 30a. The dimensions of the prism 94 are selected so that as it is rotating, it covers only one input optical fiber 30a at a time. The optical output from the desired input optical fiber 30a is directed by the prism 94 through an internal reflection at two points to the output optical fiber 30b. At the central output fiber 30b, a graded index (GRIN) rod lens 96 is used to focus the output of the prism 94 onto the central output fiber 30b. Control of the opto-mechanical embodiment of the optical switch 92a is by a electrical controller (not shown) which translates a command to select a desired input into a rotational angle for the rotating prism 94.

Figure 6:
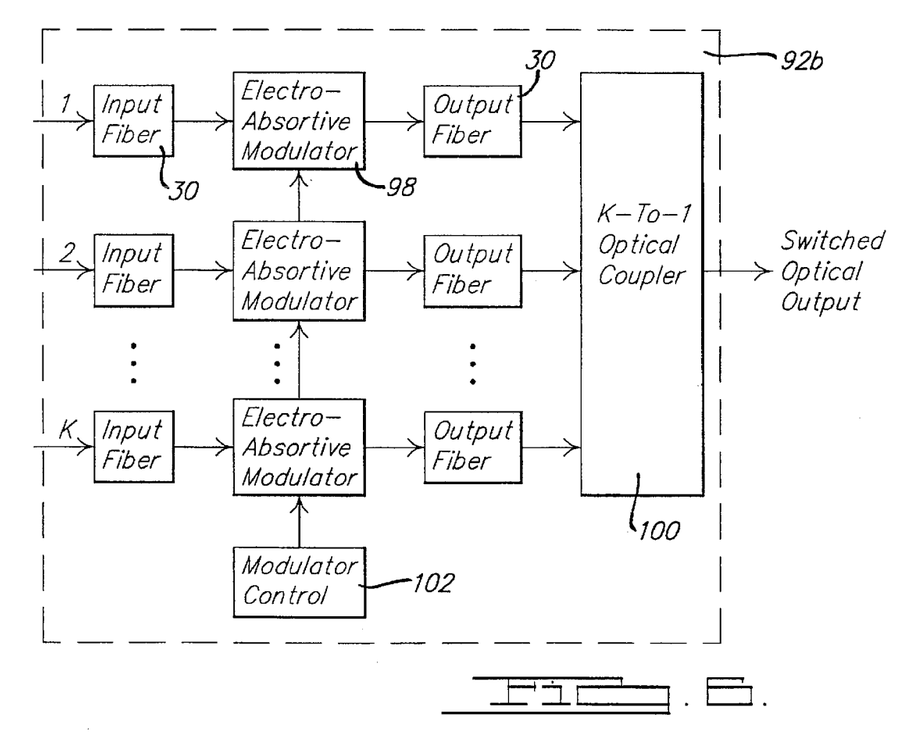
FIG. 6 is a detailed schematic block diagram of another preferred embodiment of the optical switch of FIG. 4.

Referring to FIG. 6, an electro-optical embodiment of the (K-input)×(1-output) optical switch 92b is shown. The optical switch 92b receives the K-input optical signals from the optical fibers 30 and applies the optical signals to K-electro-absorptive modulators 98. The optical signals which pass through the electro-absorptive modulators 98 are coupled to the optical fibers 30 and applied to a K-to-1 optical coupler 100. To select a desired input, an electro-absorptive modulator 98, which is preferably the modulator set forth in U.S. Pat. No. 5,402,259, is commanded by a modulator controller 102 to transmit (i.e. not absorb) an input optical signal from an optical fiber 30, while the remaining electro-absorptive modulators 98 for the other inputs not of interest are commanded to not transmit (i.e. absorb) the optical signal from their corresponding optical fibers 30. By combining all the K electro-absorptive modulator outputs 98 in the optical coupler 100, the single input of interest which has not been absorbed appears at the optical switch 92b output. The modulator controller 102 controls the electro-absorptive modulators 98 by translating commands to select desired "on/off" signals to be applied to the appropriate electro-absorptive modulators 98.

Use of the photonic interconnect and photonic processing apparatus 10 within the satellite 12 significantly reduces the size and weight requirements of the satellite 12, which in turn reduces the overall power requirements of the satellite 12. In addition, with the reduced weight, size and power requirements, the overall launch costs, as well as the costs of the satellite 12 are significantly reduced. Moreover, by converting multiple RF signals received by the satellite 12 into optical signals, bandwidth limitation normally exhibited with satellites utilizing coaxial cables have been eliminated, thereby making the satellite 12 more versatile than conventional satellites.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A photonic interconnect and photonic processing apparatus for use in onboard distribution and routing of optical signals in a communication and data handling satellite, said apparatus comprising:

receiving means for receiving a plurality of input RF signals;

optical conversion means coupled to said receiving means for converting said plurality of input RF signals to a plurality of input optical signals, said plurality of input optical signals being coupled to at least one input optical fiber; and distribution means optically coupled to said optical conversion means for distribution and routing of the optical signals onboard the communications and data handling satellite, said distribution means distributing at least one output optical signal from said plurality of input optical signals coupled to said at least one input optical fiber, said at least one output optical signal being coupled to at least one output optical fiber, wherein said at least one output optical signal coupled to said at least one output optical fiber is distributed within said communication and data handling satellite.

2. The photonic interconnect and photonic processing apparatus as defined in claim 1 further comprising output means optically coupled to said distribution means for processing said at least one output optical signal coupled to said at least one output optical fiber.

3. The photonic interconnect and photonic processing apparatus as defined in claim 1 wherein said receiving means includes an RF antenna.

4. The photonic interconnect and photonic processing apparatus as defined in claim 1 wherein said receiving means further receives a plurality of direct input optical signals and said optical conversion means couples said direct input optical signals to a plurality of input optical fibers.

5. The photonic interconnect and photonic processing apparatus as defined in claim 4 wherein said distribution means includes an optical combiner responsive to said plurality of input optical signals coupled to said plurality of input optical fibers so as to sum said plurality of input optical signals to generate a summed output optical signal which is coupled to said at least one output optical fiber.

6. The photonic interconnect and photonic processing apparatus as defined in claim 5 wherein said distribution means further includes a passive splitter responsive to said summed output optical signal coupled to said at least one output optical fiber so as to power divide and distribute said summed output optical signal to a plurality of output optical fibers from said passive splitter.

7. The photonic interconnect and photonic processing apparatus as defined in claim 1 wherein said distribution means includes an optical power divider and switching unit responsive to at least a single input optical signal coupled to said at least one input optical fiber so as to route said at least single input optical signal to at least one of a plurality of output optical fibers.

8. The photonic interconnect and photonic processing apparatus as defined in claim 2 wherein said output means selects said at least one output optical signal from said at least one output optical fiber and amplifies said at least one output optical signal.

9. The photonic interconnect and photonic processing apparatus as defined in claim 2 wherein said output means selects said at least one output optical signal from said at least one output optical fiber and converts said at least one output optical signal to a RF signal.

10. A photonic interconnect and photonic processing apparatus for use in onboard distribution and routing of optical signals in a communication and data handling satellite which receives a plurality of input RF signals, said apparatus comprising:

a plurality of optical modulators being responsive to the plurality of input RF signals so as to convert the plurality of input RF signals to a plurality of input optical signals, said plurality of input optical signals being coupled to a plurality of input optical fibers; and a distribution module operable to distribute and route the optical signals onboard the communication and data handling satellite, said distribution module including, an optical combiner optically coupled to said plurality of optical modulators with said plurality of input optical fibers, said optical combiner being responsive to said plurality of input optical signals so as to sum said plurality of input optical signals to generate at least one summed output optical signal, said at least one summed output optical signal coupled to at least one output optical fiber; and a passive splitter optically coupled to said optical combiner with said at least one output optical fiber, said passive splitter being responsive to said summed output optical signal so as to power divide said summed output optical signal into a plurality of summed output optical signals.

11. The photonic interconnect and photonic processing apparatus as defined in claim 10 wherein said plurality of optical modulators are driven by a plurality of lasers, whereby said plurality of input optical signals each includes a unique optical wavelength carrier signal.

12. The photonic interconnect and photonic processing apparatus as defined in claim 10 wherein the satellite receives a plurality of direct input optical signals, whereby said optical combiner is optically coupled to said direct input optical signals so as to sum said direct input optical signals with said plurality of input optical signals to generate said at least one summed output optical signal.

13. The photonic interconnect and photonic processing apparatus as defined in claim 10 wherein said at least one summed output optical signal includes a sum of all of said plurality of input optical signals.

14. The photonic interconnect and photonic processing apparatus as defined in claim 10 wherein said at least one summed output optical signal includes a sum of a sub-set of said plurality of input optical signals.

15. The photonic interconnect and photonic processing apparatus as defined in claim 10 further comprising an output module, wherein one of said plurality of summed output optical signals is optically filtered and optically amplified and one of said plurality of summed output optical signals is optically filtered and converted from an optical signal to an RF signal.

16. A photonic interconnect and photonic processing apparatus for use with onboard distributing and routing of optical signals in a communication and data handling satellite which receives a plurality of input RF signals, said apparatus comprising:

a plurality of optical modulators being responsive to the plurality of input RF signals so as to convert said plurality of input RF signals to a plurality of input optical signals, said plurality of input optical signals being coupled to a plurality of input optical fibers; and a distribution module operable to distribute and route the optical signals onboard the communication and data handling satellite, said distribution module including, an optical power divider and switching unit optically coupled to said plurality of optical modulators with said plurality of input optical fibers, said optical power divider and switching unit being responsive to said plurality of input optical signals so as to route any one of said plurality of input optical signals to any one of a plurality of optical outputs from said optical power divider and switching unit.

17. The photonic interconnect and photonic processing apparatus as defined in claim 16 wherein each of said optical modulators is driven by a laser each having a same wavelength carrier signal.

18. The photonic interconnect and photonic processing apparatus as defined in claim 16 wherein said optical power divider and switching unit includes a plurality of passive splinters and a plurality of optical switches.

19. The photonic interconnect and photonic processing apparatus as defined in claim 18 wherein each of said passive splinters includes a single optical input and a plurality of optical outputs, said single optical input coupled to a single input optical fiber carrying a single input optical signal, whereby said single input optical signal is power divided among said plurality of optical outputs.

20. The photonic interconnect and photonic processing apparatus as defined in claim 18 wherein each of said optical switches includes a plurality of optical inputs corresponding to the number of passive splinters and a single optical output, whereby said optical switch switches one of said optical inputs to said optical output.

21. The photonic interconnect and photonic processing apparatus as defined in claim 20 wherein each of said optical switches includes a plurality of input optical fibers coupled to said plurality of optical inputs, a single output optical fiber coupled to said single optical output, and a rotating prism which rotates about an axis longitudinal to said single output optical fiber for optically coupling one of said input optical fibers to said single output optical fiber.

22. The photonic interconnect and photonic processing apparatus as defined in claim 20 wherein each of said optical switches includes a plurality of optical input fibers coupled to said plurality of optical inputs, a single output fiber coupled to said single optical output, and a plurality of electro-absorptive modulators coupled to said plurality of input optical fibers, whereby said electro-absorptive modulators optically pass a single optical signal from a single input optical fiber.

* * * * *